June 18, 1935.    H. L. JOHNSTON ET AL    2,005,374
FOOD HANDLING APPARATUS
Filed May 11, 1929    4 Sheets-Sheet 3
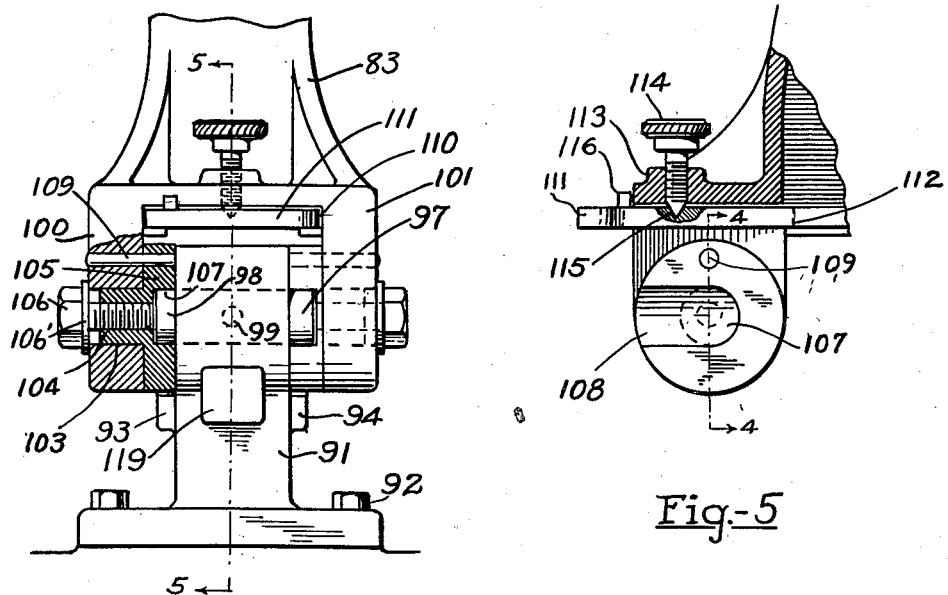
Fig.-4    Fig.-5
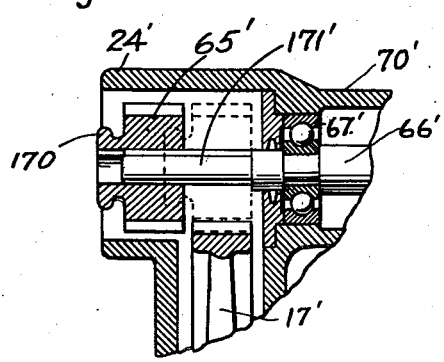 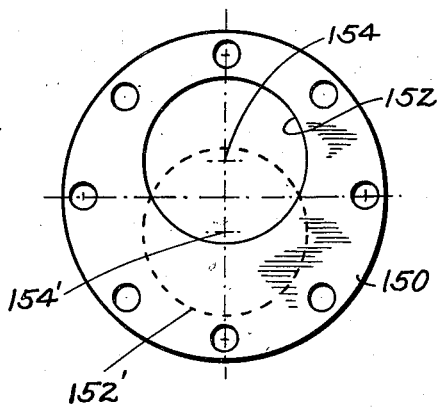
Fig.-6    Fig.-7
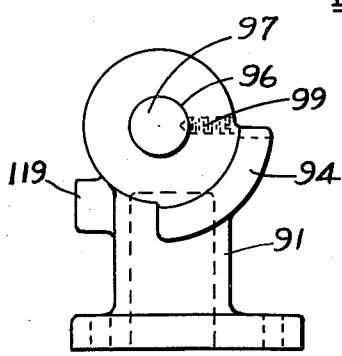
Fig.-10
INVENTORS
Herbert L. Johnston
John C. Slager
BY Maréchal and Noe
ATTORNEYS

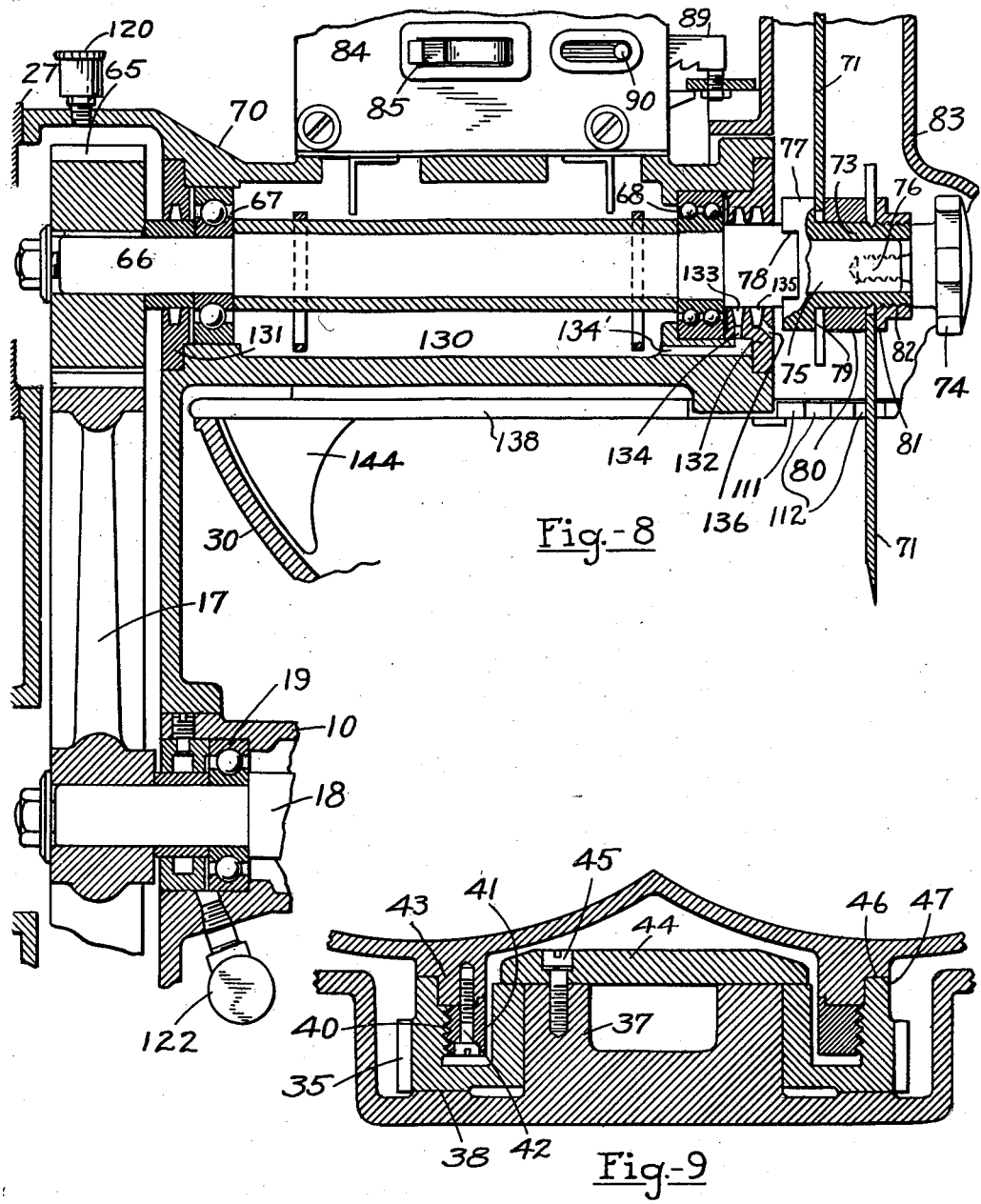

Patented June 18, 1935

2,005,374

UNITED STATES PATENT OFFICE 2,005,374

FOOD HANDLING APPARATUS

Herbert L. Johnston, Troy, and John C. Slager, Dayton, Ohio, assignors to The Hobart Manufacturing Company, Troy, Ohio, a corporation of Ohio Application May 11, 1929, Serial No. 362,216

10 Claims. (Cl. 146—67)

This invention relates to food handling apparatus especially cutting or agitating apparatus, and more particularly apparatus of this character which is motor operated.

One of the principal objects of the invention is to provide apparatus of this character which is simple and compact in construction, easy and safe in operation, and requires relatively little floor space in proportion to the amount of material capable of being handled by the apparatus.

Another object of this invention is to provide standard motor driven apparatus of this character capable of being easily and quickly converted so that movable parts of the apparatus may be driven at the most effective speeds and speed ratios under varying characteristics in the electrical supply, such as varying frequency.

Still another object of the invention is to provide motor driven apparatus of this character having an attachment connection for driving a meat chopper, coffee mill, and other attachments, in which the movable parts of the apparatus may be readily disengaged from driving connection with the motor to permit operation of the attachment with increased safety to the operator and decreased power consumption.

Other objects and advantages of the invention will be apparent from the description thereof set out below, the accompanying drawings and appended claims.

In the drawings in which like characters of reference designate like parts throughout the several views thereof, Fig. 1 is a vertical sectional view on the plane of the line 1—1 of Fig. 2, of apparatus constructed in accordance with this invention;

Fig. 4 is a side elevation of the cover mounting, with parts broken away and in section, the section being taken on the plane of line 4—4 of Fig. 5;

Fig. 5 is a vertical sectional view of the cover portion of the mounting removed from the bracket support, the section being on the plane of the line 5—5 of Fig. 4;

Fig. 6 is a partial vertical sectional view illustrating a modification;

Fig. 7 is a front elevation of a detail;

Fig. 8 is an enlarged vertical sectional view of a portion of the apparatus taken on substantially the plane of the line 8—8 of Fig. 2;

Fig. 9 is an enlarged partial vertical sectional view of the bowl mounting taken on the plane of the section of Fig. 1; and Fig. 10 is an end elevation of the bracket mounting for the cover.

Figure 1:
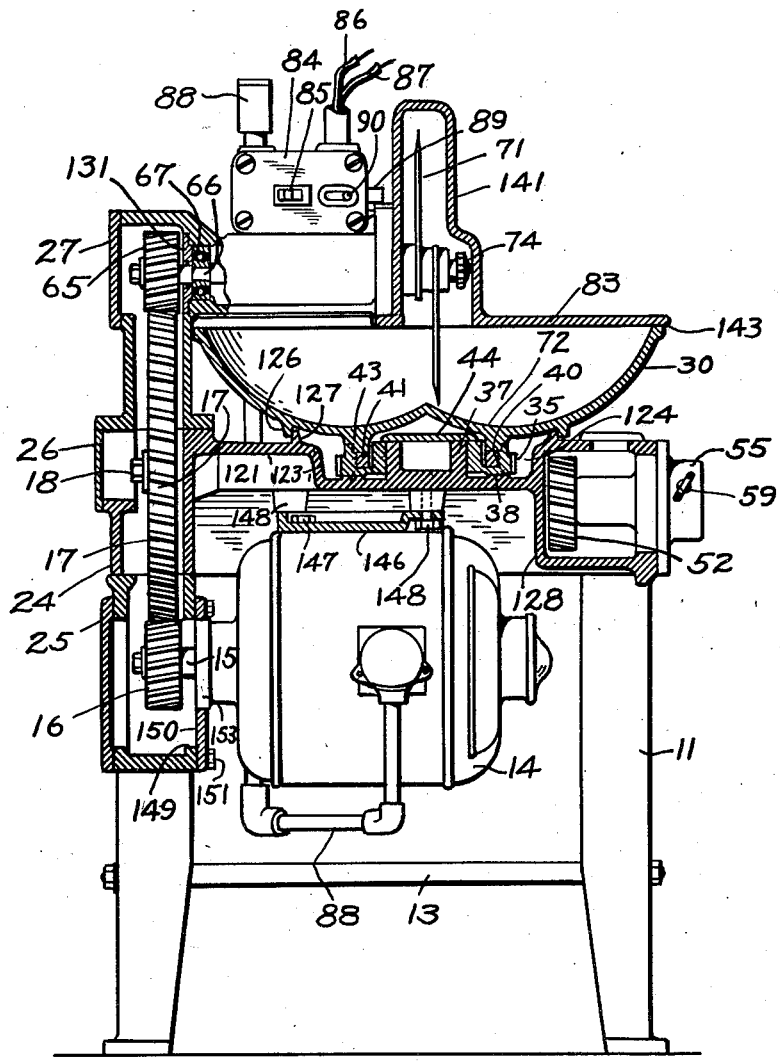

As illustrating a preferred embodiment of the invention, there is shown in the drawings an apparatus intended for chopping meat, vegetables, and the like, preliminary to further treatment in the preparation of food, which comprises a supporting frame, consisting of a table or cowl portion 10 having supporting legs 11, braced by crossrods 13. Supported by the frame is a driving motor 14 having an extended armature shaft 15 to which is keyed a fiber pinion 16 in driving engagement with a large gear 17 carried by and keyed to a shaft 18 mounted in bearings 19 and 20 carried by the frame or cowl 10. Carried by one side of the frame is a closed gear case indicated generally at 24 having removable cover plates 25, 26 and 27 to provide accessibility to the various shafts.

Rotatably mounted above the cowl is a bowl or container 30 adapted to receive the materials to be cut or treated. The shaft 18 passes transversely across the machine and is substantially enclosed within the cowl 10. Shaft 18 carries slidably and rotatably mounted thereon a worm 31 which is formed at one end with a clutch member 32 adapted to cooperate with a second clutch member 33 pinned to and rotatable with the shaft 18. The worm 31 engages with an annular gear 35 which is rigidly attached to bowl 30. Cowl 10 is provided with a central hub or upstanding boss 37 surrounded by the annular gear 35, which gear has bearing engagement at 38 upon the cowl to rotatably support bowl 30.

In order to facilitate assembly, annular gear 35 is provided with an upwardly facing screw-threaded socket 40 which receives therein an annular screw-threaded ring 41 bolted at 42 to the lower thickened wall portion 43 of bowl 30. Boss 37 is provided with a retainer plate 44 which is bolted thereto by bolts 45, to securely fasten gear 35 and related parts in place upon cowl 10. In assembling, the gear 35 is inserted into position about the hub 37, and then the cover 44 is bolted in place on the hub. The annular ring 41 is bolted to the thickened lower wall portion 43 of the container. Of course, the screw-threaded portion might be formed directly on the container 30, but the illustrated construction is used as a matter of convenience. The bowl and ring are then threaded into place within the threaded socket 40 of gear 35, this being easily accomplished by grasping the side of the bowl and turning the bowl. The bowl is screwed down until the shoulder 46 at the lower end of the bowl contacts with a shoulder 47 on the worm gear 35 to hold the parts firmly in place.

The shaft 18 is extended beyond the clutch and bearing 20 as indicated at 50, and a helical gear 51 is keyed to this extended end of the shaft. Cooperating with gear 51 is a second helical gear 52 keyed to a hollow sleeve 53 which is rotatably mounted within an elongated bearing 54 formed by an attachment coupling frame 55 bolted to the frame 10 over a side opening 56 therein. The sleeve 53 is provided with a bore 58 which is substantially square in cross section, and is adapted to receive therein in driving engagement a correspondingly shaped end of a driven shaft of an attachment, such as a meat chopper, coffee mill, or the like. The attachment connection is thus in driving connection with the motor 14 through the shaft 18 and gears 16 and 17. The coupling frame 55 is provided with a screw-threaded bore receiving a set screw 59 which can be screwed down to clamp the frame of the attachment securely in position in the tapered bore 60 of the coupling frame.

The gear 17 is in driving engagement with a pinion 65 carried by and keyed to a shaft 66 mounted in bearings 67 and 68 carried by a hollow overhanging frame extension 70 extending from the gear case 24. The shaft 66 positioned above and overhanging the rotatable bowl 30 is offset from the horizontal axis of the bowl (see Fig. 2), and carries at its end food treating means adapted to operate within the bowl, illustrated as cutting knives 71. The knives thus operate within the curved channel 72 of the bowl. These knives may be attached to the shaft 66 in any suitable manner. As shown, the knives are firmly carried by an integral supporting structure including a sleeve 73 which removably and slidably fits upon an extended end 75 of reduced diameter of shaft 66, and held thereon by an overlapping shoulder of a set screw 74 received within a threaded bore 76 in the extended shaft end 75. The sleeve 73 is provided with extensions 77 which fit in interlocking driving engagement within cut out grooves 78 in the adjacent portion of larger diameter of the shaft 66. The inner knife member rests against a shoulder 79 of sleeve 73, while the outer knife member is spaced therefrom by an annular collar 80, the parts being securely held upon the sleeve 73 by a lock nut 81 threaded upon an outer threaded end 82 of the sleeve 73. Removal of set screw 74 permits the sleeve 73 and parts carried thereby to be removed as a unit.

In order to protect an operator from injury during rotation of the cutting knives, a cover 83 is tiltably mounted over the bowl and cutting knives. Cooperating with the tiltable cover 83 is a switch mechanism indicated generally at 84 which is constructed to have interlocking engagement with the cover as a further precaution against possible injury to an operator. In the illustrated mechanism, a snap switch 85 controls the supply of electrical energy to the motor 14. The leads 86 and 87 may be connected to any suitable source of electrical energy, such as the ordinary house lighting line through a fuse and switch box (not shown). From the switch mechanism 84 leads are carried in a closed conduit 88 to the motor 14. An interlock bar 89 is provided with a manual control pin 90 for sliding the bar 89 from the position shown in Fig. 1 in which it overlaps a portion of the cover 83 and prevents raising of the cover, to a position to the left when it engages the snap switch 85 to prevent the switch from being turned on. With the parts in the position shown in Fig. 1, the interlock bar cannot be pushed to the left until the switch 85 is moved to stop the motor 14, and thus the cover cannot be tilted to permit access to bowl 30 until after the motor 14 and driven parts have been stopped. With the interlock bar 89 moved to the left, the motor cannot be started; so that the cover must be lowered back into place and the interlock bar 89 moved to the right before the machine can be put in operation.

The cover 83 is mounted on a bracket carried by the frame 10. The mounting is constructed to permit removal of the cover to facilitate cleaning of the apparatus; and as a further protective feature is so arranged that the cover can be removed only after it has been tilted back to permit access to the container. As shown more particularly in Figs. 4, 5 and 10, an upstanding bracket 91 is bolted to cowl 19 by bolts 92. The upper end of the bracket is formed with spaced arcuate shaped portions or guides 93 and 94. The bracket is also provided with a bore 96 within which is pressed a pin 97, the ends of which protrude beyond the bore as indicated at 98. The pin 97 is fixedly secured within the bore by a set screw 99.

The cover 83 has spaced depending socket members 100 and 101 nesting within the guides 93 and 94. Both socket members are identical in construction except for being faced in opposite directions. Each is formed by a depending lug integral with the cover 83, which lug has a bore 103 therethrough. Mounted in this bore is the hub 104 of a circular plate 105. The hub 104 is provided with a screw-threaded bore within which is threaded a bolt 106 having a washer 106' to clamp plate 105 in place. Plate 105 is provided at the end opposite the hub with an enlarged bore or circular opening 107 of a diameter slightly larger than the diameter of the protruding end 98 of pin 97 which is received therein, and also with a radial slot 108 extending outwardly from the bore 107. A dowel pin 109 is provided to locate the plate 105 with the slot 108 in proper position.

As shown more clearly in Fig. 5, which corresponds to the position of the cover in closed or normal operating position, the slots 108 then extend generally in a horizontal direction and the upper ends of the upwardly facing arcuate guides 93 and 94 prevent the cover from moving horizontally such as is necessary to enable the ends 98 of the pin 97 to pass through the slots 108. The arcuate shaped guides permit removal of the cover only in a general upward direction. When the cover is tilted upon its pivotal support on the pin 97 through an angle of approximately 90°, the slots 108 will then extend vertically and face downwardly. In this position, the cover may be lifted upwardly, the ends 98 of pin 97 passing through the slots 108.

Carried by the cover 83 and slidable in guides 110 is a knife cleaner 111 which comprises a rectangular plate having two spaced slots indicated at 112 through which the blades of the cutting knives 71 pass upon rotation thereof. This knife cleaner is clamped in position upon the cover 83 by a hand screw 114 which is threadedly mounted in a lateral extension 113 of cover 83. The end of screw 114 is pointed and is adapted to seat in a groove 115 of knife cleaner 111, a portion of the cleaner 111 being broken away and in section in Fig. 5 to illustrate the construction. The cleaner 111 is provided with an upstanding stop 116 adapted to contact with the end of lateral extension 113 to limit the inward movement of the cleaner 111. In assembling, with screw 114 in raised position, the cleaner 111 is inserted and slid inwardly along guides 110 until stop 116 contacts the end of lateral extension 113, when groove 115 will then be accurately centered with the axis of screw 114 which is then tightened to firmly clamp the cleaner in operating position. The bracket 91 is provided with a stop 119 against which a part carried by cover 83 is adapted to contact when the cover is tilted to open position, in order to limit the tilting movement of the cover.

Thorough lubrication of the movable parts is provided and at the same time these parts and the motor are protected from injury and the ingress of water, so that the machine may be readily washed down with a hose or the like to permit easy and rapid cleaning. As shown the motor 14, which is preferably provided with a housing substantially enclosing the motor, is in position beneath the cowl 10 of the frame and between the legs 11 thereof. The motor is thus protected from washing water directed downwardly upon the bowl and cowl, and is positioned within the horizontal confines of the frame, whereby injury due to exposure or protruding parts is avoided. At the same time, the floor space required by the machine is considerably reduced. Thus in a machine of the character illustrated, having a bowl diameter of approximately twenty-one inches and capable of handling a large amount of foodstuffs, the overall length and width of the machine is only about twenty-nine inches, while the overall height is less than four feet. The intermeshing gears forming a driving connection between the extended armature shaft of the motor and the bowl and food treating shafts are enclosed within the side gear casing 24 to provide for adequate lubrication supplied by the grease cup or pressure lubricant connection 120 and the protection from washing water. This positive gear drive overcomes the inherent objections of belt or chain drives, while affording a compact arrangement with few parts. At the same time a convenient gear ratio is provided by the intermeshing of the large gear 17 with the small pinion 65 to drive shaft 66 at the proper high speed; and by the intermeshing of motor pinion 16 with large gear 17 to drive bowl shaft 18 at a slower speed. The rotative speed of the bowl is further stepped down through the reduction gearing including the worm 31 and worm gear 35, thereby providing an efficiently operating speed ratio between the R. P. M. of the knives 71 and the R. P. M. of the bowl 30. It is to be noted that the attachment sleeve 53 is in driving engagement with the lower speed shaft 18 which operates closer to a suitable speed for the attachments than the higher speed shaft 66.

Figure 3:
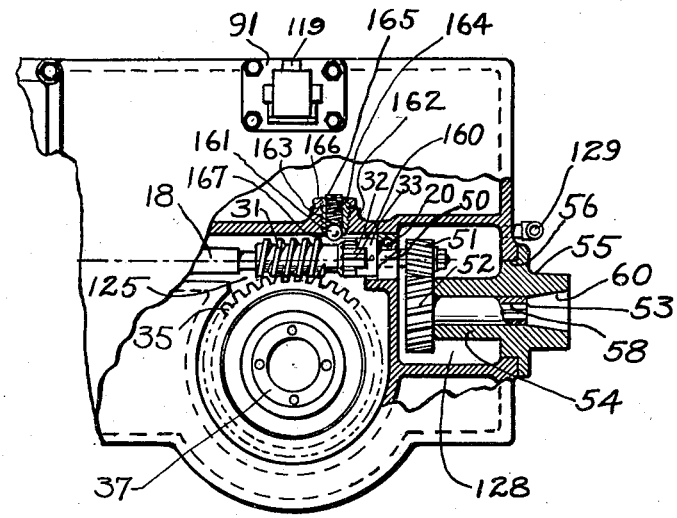
Fig. 3 is an enlarged partial plan view with parts broken away and in section to illustrate the construction.

The cowl 10 is constructed with a hollow passage 121 extending transversely across the machine, within which the shaft 18 is mounted to seal this shaft and provide an enclosure for the reception of lubricant. The bearing 19 of shaft 18 and the interior space surrounding this shaft is supplied with lubricant from a pressure lubricant connection 122. The cowl is formed with a depending pocket 123 for the bowl mounting. This forms an oil reservoir 124 about the annular worm gear 35 and the worm 31. Shaft 18 extends through its enclosing casing, as indicated in Fig. 3 at 125, into the oil reservoir 124 opposite the gear 35 to provide for the intermeshing of gears 31 and 35. The bowl 30 is provided with a depending annular lip 126, and the cowl 10 is provided with a cooperating upstanding flange 127, serving to prevent leakage of water into the oil reservoir 124. The extending end 50 of shaft 18 and the attachment connection including the intermeshing gears 51 and 52 are confined within a hollow enclosure 128 to which lubricant is supplied by connection 129.

The hollow frame extension 70 forms a stationary support for the knife shaft 66 so that this shaft and its bearings need not be moved or disturbed during the normal operation of the machine, and at the same time provides an enclosing structure forming a lubricant reservoir 130 about the shaft, which is supplied with lubricant from a suitable connection not shown. The reservoir 130 is closed at one end by a retaining ring 131 holding the bearing 67 in place, the ring having alternate projections and grooves cooperating with the shaft 66. The reservoir is closed at the other end by a retaining ring 132 holding bearing 68 in place. In order to prevent leakage of lubricant and contamination of food stuffs in the bowl, ring 132 is provided with an oil feed back arrangement, comprising an annular groove 133 formed in this ring about the shaft and a channel 134 connecting this groove to the periphery of the ring at its inner end where the oil can pass back into the reservoir 130 through a groove 134' formed in extension 70. In order to prevent the ingress of water from the outside into the bearing and oil reservoir, the ring 132 is also provided with a water feed back arrangement comprising an annular groove 135 on the outer side of groove 133 and a channel 136 connecting this groove to the exterior of the outer end of the ring.

In order to clear the overhanging frame extension 70, the tiltable cover is terminated at one side as indicated at 137. A stationary cover portion 138 is provided beneath the frame extension 70 complementary to the tiltable cover 83 to cover this portion of bowl 30. Cover portion 138 is provided with an upstanding flange 139 which snugly fits along one side of frame extension 70 and is bolted thereto as indicated at 140 to hold the cover portion securely in place. Tiltable cover 83 is formed with an upstanding portion 141 which receives the rotating knives, and a semicircular hub portion 142 which receives and loosely fits over the extended end of the frame extension 70. The construction is preferably such that the cover 83 rests as indicated at 143 upon the smooth flattened peripheral lip of bowl 30 to prevent the escape of foodstuffs from the bowl. Cover portion 138 is likewise arranged to have a sliding and sealing engagement with the lip of the bowl, and carries a baffle 144 to direct foodstuffs back into the channel 72 of the bowl to be again acted upon by the knives. Both covers terminate short of one side of the bowl so that an open space 145 is provided through which an operator may watch the progress of the cutting operation. The upstanding portion 141 is curved downwardly at 172 almost into engagement with the bottom of the bowl so that the knives are effectively enclosed, and an operator may insert his hand into the space 145 to remove foodstuffs during operation of the device without danger of injury.

In actual practice, such motor driven food handling machines are operated upon different sources of supply of electrical energy in different localities, and upon electrical energy of varying characteristics. Thus some localities are supplied with 60-cycle alternating current, while other localities are supplied with 50, 40, 30, 25, or other cycle current. It is found that with apparatus of this character, the most effective results are obtained when the cutting knives are driven at a high speed within a certain high speed range, and the bowl is rotated at a slow speed within a certain slow speed range, and the ratio of the speed of the cutting knives to the speed of rotation of the bowl is maintained within a certain speed ratio range, whereby the bowl rotates through only a very slight angle for each rotation of the knives so that the knives cut thin slices of the material being treated. Thus very effective results are secured in a machine of the character and size above described with a knife speed of substantially 1750 R. P. M.; and a bowl speed of substantially 10 R. P. M., giving a speed ratio of 175 to 1. It is also desirable from the standpoint of economy to provide constant speed motors, such as induction type A. C. motors, as the power means.

The present invention provides a standard construction of machine which may have a constant speed motor, and in which the proper speeds of rotation of the cutting knives and the bowl as well as the proper speed ratio therebetween may be readily obtained irrespective of varying frequencies encountered. As shown, the machine is provided with a standard size construction of frame, bowl, cutter shaft and driving mechanism including gears 17 and 65 which provides for a constant speed ratio between the rotative speeds of the knives and bowl. Associated with this standard arrangement is a unitary motor assembly comprising the driving motor 14 having an extended armature shaft with interchangeable pinion 16, the motor and pinion being also detachable as a unit. Thus if a 50-cycle current is encountered instead of a 60-cycle current, a larger size pinion may quickly and easily replace a 60-cycle pinion to secure the desired speeds and speed ratios.

In order to provide for the proper meshing of interchangeable pinions of various sizes, the motor 14 is suspended from the lower portion of the cowl 19 by means of an interchangeable mounting or booster block 146 which is removably fastened to the motor housing by bolts 147 and is removably fastened to the bottom of the cowl 10 by bolts 148. Thus as standard equipment with the interchangeable pinions for the electrical circuits of various frequencies, a number of different booster blocks 146 may be provided, which booster blocks are of varying sizes in order to support the motor with the center line of the armature shaft at different elevations so that the varying diameter pinions may properly mesh with the gear 17. Thus the standard machine can be adapted to the varying frequency conditions encountered, or can be converted to desired speeds very easily and quickly.

In order to permit the unitary motor assembly to be removed from or assembled on the machine without disassembly of the parts, the rear of the gear case 24 is provided with an opening 149 closed by a removable cover plate 150 bolted thereto by bolts 151. The removable cover plate 150 is more particularly illustrated in Fig. 7. As shown, the plate is provided with a circular opening 152 adapted to snugly receive the extended end 153 of the motor housing, to close the gear case 24. The construction of the plate 150 shown in full lines is for a 60-cycle four-pole A. C. motor or a 30-cycle two-pole A. C. motor. The construction is such that the proper position of the opening 152 in the plate 150 for a 50-cycle four-pole A. C. motor or a 25-cycle two-pole A. C. motor, in order to obtain the proper speed and speed ratios with an interchangeable pinion 16 of the proper size, is indicated in dotted lines at 152'. The opening 149 and plate 150 may be constructed of such size that the center indicated at 154' of the circular opening 152' is located the same distance below the horizontal diameter of the plate 150 as the center 154 of the circular opening 152 is located above the horizontal diameter of the plate. Therefore a plate suitable for 60-cycle four-pole and 30-cycle two-pole motors may be used for 50-cycle four-pole and 25-cycle two-pole motors by merely turning the plate through an angle of 180 degrees so that the opening is moved from the position shown in full lines to the position shown in dotted lines, whereby a single plate is suitable for all four frequencies. To take care of other frequencies, different interchangeable plates having properly positioned openings therein are provided. By removing the bolts 148 and the bolts 151, the motor 14 with extended armature shaft 15 and pinion 16 together with the cover plate 150 and the booster block 146 may be removed and replaced as a unit.

The machine is equipped as above described with an attachment connection whereby various power driven attachments such as meat choppers, coffee mills, and the like may be used with the machine, the motor 14 and driving interconnections being used to operate the power driven attachments. In order to protect the operator from injury and to reduce the power consumption when an attachment is used, means are provided for stopping operation of the bowl 30. This is accomplished by the provision of the worm 31 which is mounted for axial sliding movement on shaft 18 and the clutch 32—33. In the position shown in Fig. 3, the clutch members are in engagement, and as clutch member 33 is keyed to shaft 18 the worm 31 is positively rotated during rotation of shaft 18 to thereby rotate the worm gear 35 and bowl 30. The normal direction of rotation of bowl 30, when driven by the motor during operation, is counter-clockwise as shown by the arrow in Fig. 2, so that the thrust produced by the intermeshing of gear 35 with worm 31 tends to hold the clutch members 32—33 in engagement. When it is desired to disengage the clutch members 32—33 to stop rotation of the bowl 30, this may be accomplished by grasping the bowl 30 and turning it in a counter-clockwise direction faster than its speed of rotation, which serves through the intermeshing gears 35 and 31 to slide the worm 31 to the left along the shaft 14 to remove the clutch member 32 from the clutch member 33 while maintaining the worm 31 in mesh with the worm gear 35.

Figure 2:
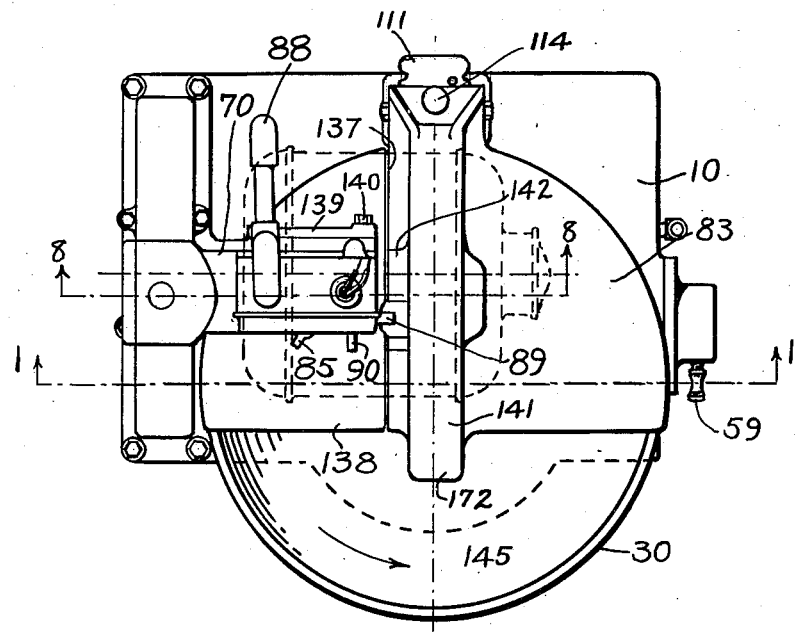
Fig. 2 is a plan view of the apparatus.

The clutch member 32 is provided with a plurality of grooves or slots 160 about its periphery into which a spring pressed ball 161 is adapted to fall when the worm 31 is slid to its disengaged position to thereby hold the worm in this disengaged position, and permit shaft 18 to freely rotate within the worm. The attachment connection may then be driven through shaft 18 and hollow sleeve 53 without rotation of the bowl. When it is again desired to provide a driving connection between shaft 18 and bowl 30, the bowl is turned clockwise as shown in Figs. 2 and 3 to overcome the restraining action of spring-pressed ball 161 to move worm 31 to the right along shaft 18 to re-engage the clutch members 32—33. Adjacent worm 31 and clutch member 32, the cowl 10 is provided with an outstanding boss 162 which is interiorly threaded to receive an exteriorly threaded sleeve 163 within which is positioned the ball 161 and a spring 164. These parts are held in place by means of a stop 165 which is screwed into the interior of the outer end of sleeve 163, and a lock nut 166 is screwed onto the outer end of sleeve 163 to contact with the boss 162 to lock the parts in adjusted position. The lower end of sleeve 163 is provided with an inturned lip 167 of such diameter as to prevent the ball 161 from passing therethrough. The construction is such that when the worm 31 is in driving engagement with shaft 18 through the clutch members 32—33, the ball 161 is held out of contact with the surface of the worm, but when the worm is in its disengaged position the ball sets within one of the slots 160 to lock the worm in this position.

In Fig. 6 is shown a slightly modified form in which means are provided for stopping operation of the cutter shaft and cutting knives carried thereby, or for stopping rotation of the bowl, or both, when the attachment connection is to be used. The machine is identical in construction with that previously described, except that in addition the pinion 65' is slidably mounted upon but keyed to the shaft 66' carried in bearings, one of which is indicated at 67', in the frame extension 70' of the gear case 24'. The gear 65' is provided with a suitable manipulating button 170 whereby it may be slid along the extended end 171' of shaft 66' from the disengaged position as shown in full lines in Fig. 6 to the engaged position as shown in dotted lines when it meshes with the large gear 17'. Thus by sliding the gear 65' to disengaged position, and by grasping the bowl and turning it to disengage the worm clutch, the operation of both the cutting knives and the bowl may be stopped, so that the attachment connection can be used with a minimum of danger to the operator and a minimum of expenditure of power.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In apparatus of the character described, a driving shaft, a rotatable container, a gear rotatable with said container, and a gear on said driving shaft in driving relation with said gear on the container, said gear rotatable with the container serving as a bearing for rotatably supporting the container.

2. In apparatus of the character described, a container, and a gear for rotating said container, said container and said gear having a cooperating screw-threaded ring and a screw-threaded socket, whereby the container may be fastened to said gear for driving engagement thereby by turning the container to thread the ring into the threaded socket, said gear being provided with supporting surfaces for said container.

3. In apparatus of the character described, a frame having a central hub, an annular gear surrounding said hub and having bearing contact on said frame, a cover plate fastened to said central hub for clamping said gear in place, said annular gear having an outwardly facing annular screw-threaded socket, and a container having a screw-threaded annular ring portion adapted to be received in said screw-threaded socket to fasten the container to said annular gear.

4. Food handling apparatus of the character described, comprising a container, power operated means for operating upon foodstuffs within the container, a tiltable cover for said container, means preventing tilting of the cover to permit access to the container except after the power operated means within the container has been stopped, and a mounting for said cover constructed to permit removal of the cover from the container only after the cover has been tilted back to permit access to the container.

5. Food handling apparatus of the character described, comprising a frame, a container, means for operating upon foodstuffs within said container, a cover for said container, a bracket member mounted on said frame and having an arcuate shaped portion, a socket member carried by said cover adapted to nest within said arcuate shaped portion, and a pin carried by one of said members, said other member having a bore receiving said pin and a removal slot permitting disengagement of the pin from the bore, said arcuate shaped portion preventing removal of the socket member of the cover nesting therein except in the general direction in which the arcuate shaped portion faces.

6. Food handling apparatus of the character described, comprising in combination, a frame, a motor having a drive shaft carried by the frame, a container rotatably mounted on the frame, a shaft for rotating said container, a driving connection between said motor drive shaft and said container shaft consisting of a pinion on said motor driven shaft meshing with a large gear on said container shaft, a shaft overhanging the container, food treating means carried by said last mentioned shaft and adapted to operate within said container, a driving connection between said container shaft and said food treating shaft consisting of a pinion on said food treating shaft meshing with said large gear on the container shaft and adapted to drive said food treating shaft at substantially the same speed as said motor shaft, an attachment connection having a driven member connected in driven relationship directly to said container shaft, and clutch means interconnecting said container shaft with said container, whereby the driving connection between said container shaft and said container may be broken without disturbing the driving connection between said container shaft and said attachment driven member.

7. In apparatus of the character described, a frame having a lubricant containing basin, a rotatable container, an annular gear connected to and rotatable with said container, a driving shaft, a gear on said driving shaft in driving relation with said annular gear, said annular gear having an annular bearing seat within said lubricant containing basin and providing a stable bearing for rotatably supporting the container.

8. Food handling apparatus of the character described, comprising a frame, a container, means for operating upon foodstuffs in the container, a bracket mounted on said frame having arcuate shaped portions facing upwardly at opposite ends thereof, spaced socket members carried by said cover nesting within said arcuate portions whereby the sockets may be removed therefrom by movement in a general upward direction in which said arcuate shaped portions face, pin projections extending outwardly at opposite sides of said bracket; said sockets having bores receiving said pin projections, said sockets also having radial slots so positioned that when the cover is closed removal thereof is prevented, and when the cover has been tilted back to permit access to the container, the radial slots extend downwardly to permit upward removal of the cover as the pins pass through said slots.

9. In food handling apparatus of the character described, and in combination, a rotary container, a rotary knife adapted to operate therein, a cover for said container having spaced guides formed therein, a cleaner for said knife removably mounted in said guides, and a locking screw carried by said cover, said cleaner having a seating groove for the end of said screw to locate said cleaner and clamp it in operative position within said guides.

10. Food handling apparatus of the character described comprising a frame having a substantially impervious cowl, a container rotatably mounted on the frame above said cowl, a shaft mounted in said frame and overhanging the container, food treating means carried by said shaft and adapted to operate within said container, a motor positioned closely beneath and protected by said cowl, driving connections between said motor, said rotatable container and said food treating shaft consisting of a driving pinion on said motor, a large gear meshing with said pinion for rotating said container, and a second pinion on said food treating shaft meshing with said large gear and adapted to drive said food treating shaft at substantially the same speed as the motor shaft, said driving connections being located at the side of said cowl, and a cover for enclosing said driving connections.

HERBERT L. JOHNSTON.
JOHN C. SLAGER.